(12) United States Patent
Kim et al.

(10) Patent No.: US 9,565,330 B2
(45) Date of Patent: Feb. 7, 2017

(54) IMAGE READING APPARATUS FOR ADJUSTING AN IMAGE READER

(71) Applicant: FUJI XEROX CO., LTD., Tokyo (JP)

(72) Inventors: Dalyong Kim, Kanagawa (JP);
Sangchun Park, Kanagawa (JP);
Nobuyuki Maruno, Kanagawa (JP);
Yuichi Mikuni, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/711,239

(22) Filed: May 13, 2015

(65) Prior Publication Data

US 2016/0142561 A1    May 19, 2016

(30) Foreign Application Priority Data

Nov. 17, 2014   (JP) .................................. 2014-232487

(51) Int. Cl.
*H04N 1/10* (2006.01)
*H04N 1/00* (2006.01)

(52) U.S. Cl.
CPC ........ *H04N 1/1039* (2013.01); *H04N 1/00819* (2013.01); *H04N 1/1013* (2013.01); *H04N 1/1026* (2013.01)

(58) Field of Classification Search
CPC ............ H04N 1/00082; H04N 1/00013; H04N 1/00559; H04N 1/1013; H04N 1/1026; H04N 1/1039
USPC .......................... 358/1.5, 501, 505, 530, 497
See application file for complete search history.

(56) References Cited

U.S. PATENT DOCUMENTS 5,488,490 A * 1/1996 Sawada ................ H04N 1/1008
358/474
6,115,147 A * 9/2000 Mizumoto ............. H04N 1/192
358/483

FOREIGN PATENT DOCUMENTS

JP            10-004469 A      1/1998

* cited by examiner

*Primary Examiner* — Jamares Q Washington
(74) *Attorney, Agent, or Firm* — Sughrue Mion, PLLC

(57) ABSTRACT

An image reading apparatus includes a reader that reads an image of a document by using plural light receiving elements arranged in a first scanning direction; a moving unit that moves the reader in a second scanning direction to move a reading position at which the reader reads the document; and an adjusting unit that moves the reader in the first scanning direction to adjust a position of the reader in the first scanning direction.

9 Claims, 10 Drawing Sheets

IMAGE READING APPARATUS FOR ADJUSTING AN IMAGE READER

CROSS-REFERENCE TO RELATED APPLICATIONS

This application is based on and claims priority under 35 USC 119 from Japanese Patent Application No. 2014-232487 filed Nov. 17, 2014.

BACKGROUND (i) Technical Field

The present invention relates to an image reading apparatus.

(ii) Related Art

In the case where a reader including plural light receiving elements arranged in a first scanning direction is moved in a second scanning direction to read an image on a document sheet, if the reader is displaced in the first scanning direction, there is a risk that a reading failure will occur.

SUMMARY

According to an aspect of the invention, there is provided an image reading apparatus including a reader that reads an image of a document by using plural light receiving elements arranged in a first scanning direction; a moving unit that moves the reader in a second scanning direction to move a reading position at which the reader reads the document; and an adjusting unit that moves the reader in the first scanning direction to adjust a position of the reader in the first scanning direction.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described with reference to the accompanying drawings.

Figure 1:
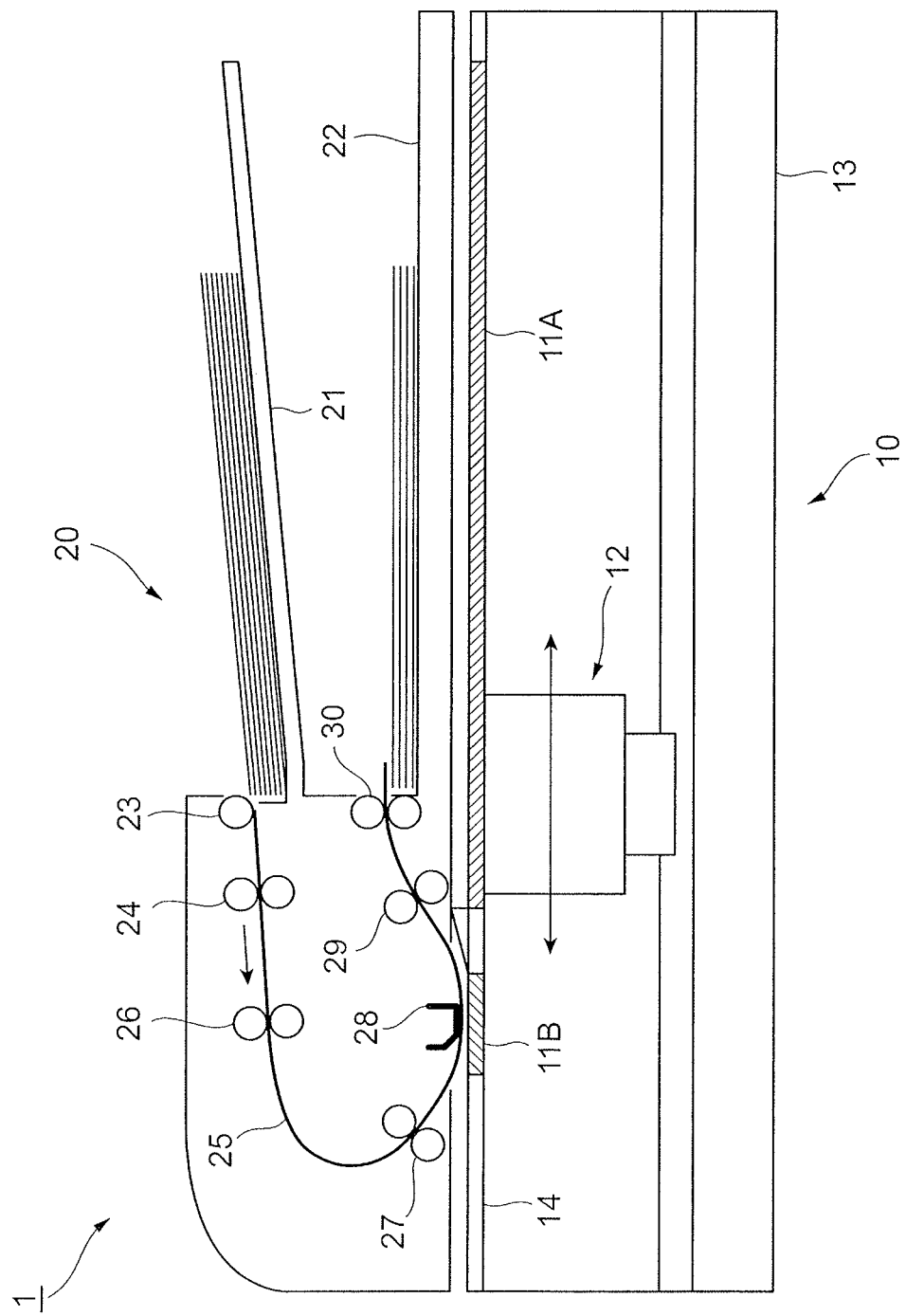
FIG. 1 illustrates the overall structure of an image reading apparatus.

FIG. 1 illustrates the overall structure of an image reading apparatus 1.

The image reading apparatus 1 illustrated in FIG. 1 includes a scanner device 10 that reads an image of a document by scanning the document and a document feeder 20 that successively feeds document sheets that are stacked.

The document feeder 20 includes a document receiver 21 that receives a stack of document sheets and an output sheet receiver 22 that is disposed below the document receiver 21 and that receives the document sheets that have been scanned. The document feeder 20 also includes a feed roller 23 that feeds the document sheets stacked on the document receiver 21 and a separating mechanism 24 that separates the sheets from each other.

The document sheets are transported along a transport path 25. Transport rollers 26 and registration rollers 27 are arranged along the transport path 25. The transport rollers 26 transport the document sheets that have been separated from each other toward rollers located downstream of the transport rollers 26. The registration rollers 27 feed the document sheets while performing a registration adjustment.

A chute 28 guides a document sheet that is being read by the scanner device 10. After the document sheet is read, the document sheet is transported further downstream by output rollers 29. Then, the document sheet is ejected to the output sheet receiver 22 by ejection rollers 30.

The scanner device 10 includes a housing 13 and an upper cover 14.

A first platen glass 11A and a second platen glass 11B are attached to the upper cover 14. The first platen glass 11A receives a document sheet in a stationary state. The second platen glass 11B transmits light used to read the document sheet while the document sheet is being transported by the document feeder 20. The first platen glass 11A and the second platen glass 11B may either be directly supported by the upper cover 14 or indirectly supported by the upper cover 14 with other components provided therebetween.

A reading unit 12 is disposed in the housing 13. The reading unit 12 reads the document sheet while the document sheet is placed on the first platen glass 11A or being transported by the document feeder 20. A movement mechanism that moves the reading unit 12 in the left-right direction in FIG. 1 is also disposed in the housing 13.

In the case where an image of a document sheet is read while the document sheet is placed on the first platen glass 11A, the reading unit 12 is moved under the first platen glass 11A in the direction of, for example, left to right in FIG. 1. In the case where an image of a document sheet is read while the document sheet is being transported by the document feeder 20, the reading unit 12 is disposed below the second platen glass 11B in a stationary state.

The reading unit 12 includes a light source formed of a light emitting diode (LED) or the like, a rod lens array that focuses light reflected by the document sheet, and an image sensor that receives the light focused by the rod lens array and generates image data.

Figure 2:
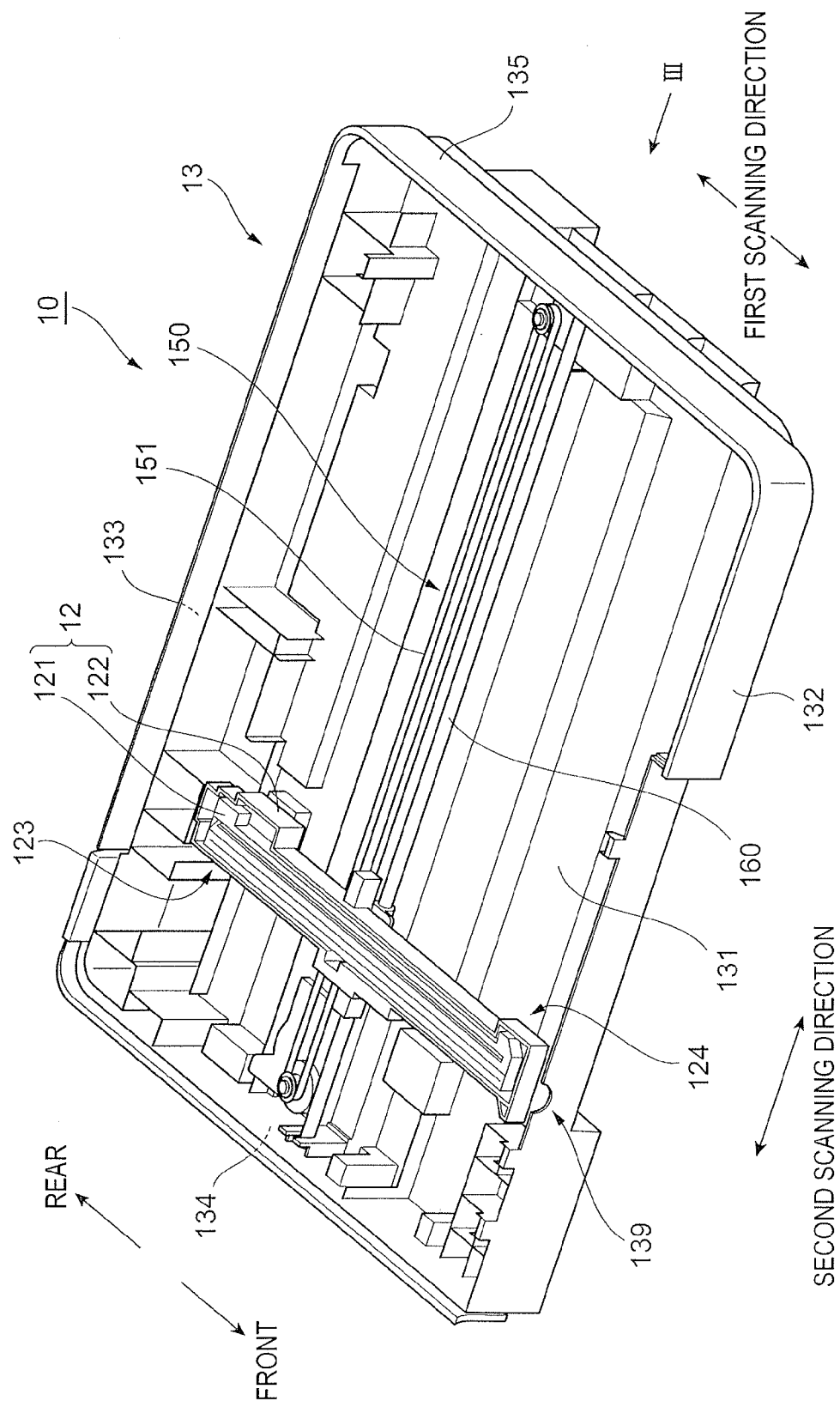
FIG. 2 illustrates a housing in the state in which an upper cover is not attached.

FIG. 2 illustrates the housing 13 in the state in which the upper cover 14 is not attached.

The housing 13, which is an example of a first container, is box-shaped and includes a bottom portion 131. The housing 13 also includes a front surface 132, a rear surface 133 that opposes the front surface 132, and first and second side surfaces 134 and 135 that connect the front surface 132 and the rear surface 133.

A hinge (not shown) for enabling the document feeder 20 (see FIG. 1) to be opened and closed is provided in a rear section of the scanner device 10. In the present exemplary embodiment, the document feeder 20 is capable of being pivoted toward the rear of the scanner device 10. Therefore, a document sheet cannot be easily placed on the first platen glass 11A (see FIG. 1) from the rear, and a user that uses the image reading apparatus 1 normally uses (operates) the image reading apparatus 1 from the front.

In the present exemplary embodiment, the front surface 132 is located near the user (opposes the user) when the user uses the image reading apparatus 1. Thus, the front surface 132 according to the present exemplary embodiment may be regarded as a user-side surface that is located near the user.

As illustrated in FIG. 2, the housing 13 contains the reading unit 12. The reading unit 12 includes a unit body 121, which functions as a reader, and a unit container 122, which is an example of a second container that contains the unit body 121. The light source, the rod lens array, and the image sensor are included in the unit body 121.

Figure 4:
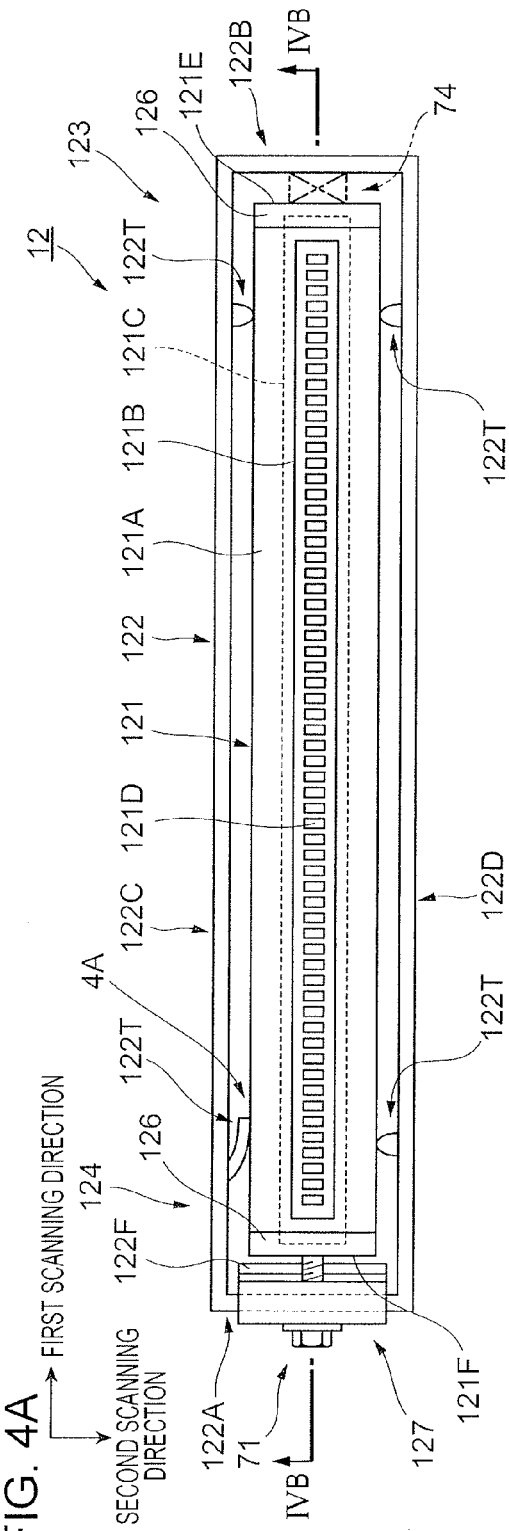
FIGS. 4A and 4B illustrate the reading unit.

Urging members 125 (see FIG. 4B), which urge the unit body 121 upward, are disposed between a bottom portion of the unit body 121 and a bottom portion of the unit container 122.

In the present exemplary embodiment, the urging members 125 urge the unit body 121 against the first platen glass 11A (see FIG. 1) or the second platen glass 11B. Accordingly, the distance between the image sensor included in the unit body 121 and the document sheet placed on the first or second platen glass 11A or 11B does not easily vary. In the present exemplary embodiment, the position of the unit body 121 is adjustable while the unit body 121 is disposed between the first platen glass 11A and the urging members 125. This will be described in detail below.

The reading unit 12 is arranged so as to extend in a widthwise direction of the housing 13 (one direction). When the reading unit 12 reads a document sheet placed on the first platen glass 11A, the reading unit 12 moves in a lengthwise direction of the housing 13 (direction that crosses, or that is perpendicular to, the one direction) while reading the document sheet.

The reading unit 12 includes one end portion at the far side in FIG. 2 (hereinafter referred to as a "far-side end portion 123"), and the other end portion at the near side in FIG. 2 (hereinafter referred to as a "near-side end portion 124").

In this specification, the one direction in which the reading unit 12 extends may be referred to as a first scanning direction, and the direction that crosses the one direction may be referred to as a second scanning direction.

A moving mechanism 150, which is an example of a moving unit that moves the reading unit 12 in the second scanning direction, is disposed in the housing 13. The moving mechanism 150 includes a belt 151 that is capable of circulating and attached to the unit container 122.

The moving mechanism 150 also includes a motor (not shown) that drives the belt 151. In the present exemplary embodiment, the unit container 122 is moved in the second scanning direction by the moving mechanism 150, so that the unit body 121 contained in the unit container 122 is also moved in the second scanning direction.

A support shaft 160, which supports the reading unit 12 from below, is disposed in the housing 13. The support shaft 160 is arranged so as to extend in the second scanning direction.

Figure 3:
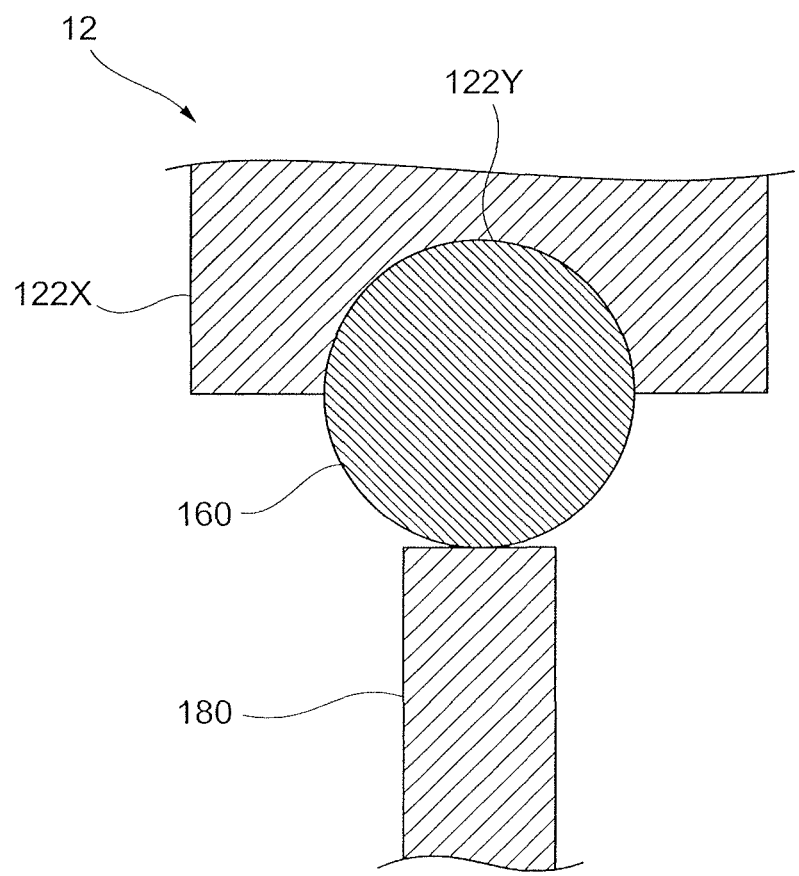
FIG. 3 illustrates a reading unit and a support shaft viewed in the direction shown by arrow III in FIG. 2.

FIG. 3 illustrates the reading unit 12 and the support shaft 160 viewed in the direction of arrow III in FIG. 2.

As illustrated in FIG. 3, the unit container 122 (see FIG. 2) of the reading unit 12 includes a projecting portion 122X that projects downward at the bottom thereof. A semicircular recess 122Y is formed in the bottom surface of the projecting portion 122X.

In the present exemplary embodiment, the reading unit 12 is placed on the support shaft 160 such that the recess 122Y receives the support shaft 160. Referring to FIG. 3, a shaft rib 180 is disposed below the support shaft 160 so as to support the support shaft 160 from below. The shaft rib 180 extends upward from the bottom portion 131 of the housing 13 (not illustrated in FIG. 3).

The structure in which the reading unit 12 is placed on the support shaft 160 and supported from below is merely an example, and the reading unit 12 may instead be supported by a support shaft 160 that extends through the reading unit 12.

FIGS. 4A and 4B illustrate the reading unit 12.

FIG. 4A is a top view of the reading unit 12. FIG. 4B is a sectional view of FIG. 4A taken along line IVB-IVB. In FIG. 4B, the inside of the unit body 121 is not illustrated.

As described above, the reading unit 12 includes the unit body 121 and the unit container 122 that contains the unit body 121.

As illustrated in FIGS. 4A and 4B, the unit body 121 has a rectangular parallelepiped shape.

As illustrated in FIG. 4A, a rectangular opening 121B is formed in an upper surface 121A of the unit body 121. In addition, an image sensor 121C is disposed in the unit body 121.

The image sensor 121C is arranged so as to extend in the longitudinal direction (first scanning direction) of the unit body 121. The image sensor 121C includes an array of plural light receiving elements (photoelectric transducers) 121D formed of photodiodes (PD) or the like. The light receiving elements 121D are arranged in the longitudinal direction (first scanning direction) of the unit body 121.

The unit body 121 includes the light source (not shown) and the rod lens array (not shown), which is disposed in the opening 121B of the unit body 121.

As illustrated in FIGS. 4A and 4B, the unit container 122 has a rectangular parallelepiped shape with an open top. The unit body 121 is installed into the unit container 122 through the opening at the top of the unit container 122.

As illustrated in FIG. 4A, the unit container 122 includes four side walls, which are a front side wall 122A, a rear side wall 122B, a first connection side wall 122C that connects the front side wall 122A and the rear side wall 122B, and a second connection side wall 122D that opposes the first connection side wall 122C. As illustrated in FIG. 4B, the unit container 122 also includes a bottom portion 122E that supports the unit body 121 from below.

In addition, as illustrated in FIG. 4B, the reading unit 12 includes the urging members 125 that urge the unit body 121 upward, that is, toward the first platen glass 11A or the second platen glass 11B.

The urging members 125 are provided at both ends of the unit body 121 in the longitudinal direction. In the present exemplary embodiment, both end portions of the unit body 121 in the longitudinal direction are urged upward by the urging members 125. Thus, the unit body 121 is pressed against the first platen glass 11A or the second platen glass 11B.

Figure 5:
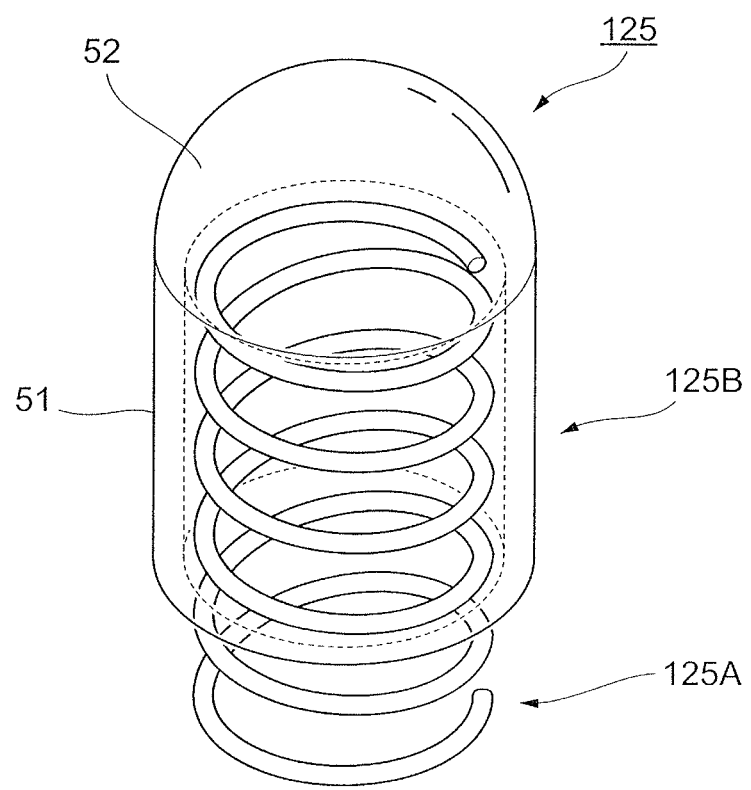
FIG. 5 illustrates an urging member.

FIG. 5 illustrates the structure of each urging member 125.

Each urging member 125 includes an elastic member 125A formed of a coil spring and a pressing member 125B that is urged upward by the elastic member 125A and presses the unit body 121 from below.

The pressing member 125B includes a cylindrical body 51 having a cylindrical shape and an end face 52 that covers the top end of the cylindrical body 51 in FIG. 5. The pressing member 125B has an open bottom, and the elastic member 125A is inserted into the pressing member 125B from the bottom.

The end face 52 of the pressing member 125B is dome-shaped, and bulges upward in FIG. 5. The pressing member 125B is formed of a material having a high slidability, such as polyacetal (POM).

As described below, in the present exemplary embodiment, the unit body 121 is moved in the first scanning direction. At this time, the unit body 121 may be moved smoothly.

More specifically, in the present exemplary embodiment, the end face 52 is dome-shaped, so that the contact area between the end face 52 and the unit body 121 is small. Therefore, compared to the case in which, for example, the end face 52 is flat, the unit body 121 may be moved more smoothly.

In addition, in the present exemplary embodiment, the pressing member 125B is formed of a material having a high slidability, such as polyacetal (POM). Therefore, compared to the case in which the pressing member 125B is formed of a material having a low slidability, the unit body 121 may be moved more smoothly.

In the present exemplary embodiment, the urging members 125 are provided to urge the unit body 121 upward. However, alternatively, portions of the bottom portion 122E (see FIG. 4B) of the unit container 122 may be cut and bent upward so that elastic portions are formed, and the unit body 121 may be urged upward by these elastic portions.

The reading unit 12 will be further described with reference to FIGS. 4A and 4B.

As illustrated in FIGS. 4A and 4B, spacers 126 are provided on the top surface 121A of the unit body 121 at both ends of the unit body 121 in the longitudinal direction. The spacers 126 determine the size of the gap between the unit body 121 and each of the first platen glass 11A and the second platen glass 11B. The unit body 121, which is urged by the urging members 125, is pressed toward the first platen glass 11A or the second platen glass 11B with the spacers 126 interposed therebetween.

As illustrated in FIG. 4B, the reading unit 12 includes an adjustment mechanism 127, which is an example of an adjusting unit that adjusts the position of the unit body 121. The adjustment mechanism 127 moves the unit body 121 in the first scanning direction to adjust the position of the unit body 121 in the first scanning direction.

As illustrated in FIG. 4B, the adjustment mechanism 127 includes a screw member 71, a support metal plate 72 that supports the screw member 71, a screw urging member 73 that urges the screw member 71, and a unit urging member 74 that urges the unit body 121. The unit urging member 74 is disposed at the right side in FIG. 4B.

As illustrated in FIGS. 4A and 4B, the screw member 71 is arranged so as to extend in the first scanning direction, which is the direction in which the position of the unit body 121 is adjusted. In addition, as illustrated in FIG. 4B, the screw member 71 includes a male threaded portion 71A that has a columnar shape with a threaded outer peripheral surface, and a screw head portion 71B that is disc-shaped and that is rotated in a circumferential direction when operated by an adjuster (person who adjusts the position of the unit body 121). The male threaded portion 71A is disposed adjacent to the unit body 121, and the screw head portion 71B is disposed such that the male threaded portion 71A is disposed between the screw head portion 71B and the unit body 121.

The adjuster rotates the screw member 71 in the circumferential direction by using a tool, such as a screwdriver, so that the screw member 71 is moved in the first scanning direction (axial direction of the screw member 71).

When the screw member 71 is moved toward the unit body 121, the tip of the screw member 71 presses the unit body 121. Accordingly, the unit body 121 is moved relative to the unit container 122, and is moved rightward in FIG. 4. When the screw member 71 is moved away from the unit body 121, the unit body 121 is moved leftward in FIG. 4 by the unit urging member 74.

The unit urging member 74 is formed of, for example, a coil spring or a leaf spring. The unit urging member 74 is disposed between the rear side wall 122B of the unit container 122 and a rear end surface 121E of the unit body 121, and presses the unit body 121 toward the front of the image reading apparatus 1. More specifically, in the present exemplary embodiment, the unit urging member 74 is provided as an example of an elastic member that elastically urges the unit body 121, which serves as the reader, toward the screw member 71.

In the present exemplary embodiment, the position of the unit urging member 74 in the second scanning direction is the same as the position of the two urging members 125, which urge the unit body 121 upward, in the second scanning direction. In other words, in the present exemplary embodiment, the unit urging member 74 and the two urging members 125 are arranged on a single straight line that extends in the first scanning direction.

Thus, in the present exemplary embodiment, the position of the unit body 121 in the first scanning direction is adjustable. Therefore, the risk of occurrence of reading failure is reduced.

For example, in the case where the length of the unit body 121 (length of the image sensor 121C in the first scanning direction) is small and close to the width of the document sheet, reading failure is likely to occur. More specifically, there is a risk that, for example, an image formed at an edge of the document sheet (edge that extends in the second scanning direction) cannot be read.

In the present exemplary embodiment, the position of the unit body 121 in the first scanning direction is adjustable. By adjusting the position of the unit body 121, the risk that, for example, an image formed at an edge of the document sheet cannot be read may be reduced.

In the case where the position of the unit body 121 in the first scanning direction is adjustable as in the present exemplary embodiment, there is a high possibility that a commercially available general-purpose image sensor 121C may be used. Accordingly, the cost of the image reading apparatus 1 may be reduced.

The length of a commercially available general-purpose image sensor 121C is basically not determined in consideration of the width of the document sheet. Therefore, there may be a case in which the width of the document sheet is close to the width of the image sensor 121C.

In such a case, when the position of the image sensor 121C is not adjustable, there is a risk that the image at the edge of the document sheet cannot be read, as described above. Therefore, it is necessary to prepare a dedicated image sensor 121C (image sensor 121C that is long enough to compensate for the displacement thereof in the first scanning direction) in consideration of the width of the document sheet. As a result, the cost of the image reading apparatus 1 tends to increase.

In contrast, in the present exemplary embodiment, the position of the image sensor 121C is adjustable. Therefore, a general-purpose image sensor 121C having a length close to the width of the document sheet may be used. In such a case, the cost of the image reading apparatus 1 may be reduced.

The screw member 71 is attached to the unit container 122. Instead of being directly attached to the unit container 122, the screw member 71 is attached to the unit container 122 by using the support metal plate 72.

More specifically, the screw member 71 is attached to the unit container 122 by using the support metal plate 72, which is made of a material different from the material of the unit container 122. More specifically, in the present exemplary embodiment, the support metal plate 72, which is an example of a support member that supports the screw member 71, is provided at a position fixed relative to the unit container 122, which is an example of a second container. In the present exemplary embodiment, the screw member 71 is moved with respect to the support metal plate 72, so that the unit body 121 is moved with respect to the unit container 122 in the first scanning direction.

The unit container 122 is made of a resin material, and the support metal plate 72 is made of a metal material. A through hole 721 (see FIG. 4B) is formed in the support metal plate 72, and a female threaded portion, which meshes with the male threaded portion 71A of the screw member 71, is formed on the inner periphery of the through hole 721.

The structure may instead be such that the female threaded portion is formed on the unit container 122 and the screw member 71 is directly attached to the unit container 122. However, in the case where the female threaded portion is formed on the unit container 122 made of a resin material, it is difficult to form the female threaded portion with sufficient accuracy. In such a case, there is a risk that the adjustment accuracy of the position of the unit body 121 will be reduced.

In contrast, in the case where the female threaded portion is formed on the support metal plate 72 made of a metal, compared to the case in which the female threaded portion is formed on the unit container 122 made of a resin material, the accuracy of the female threaded portion may be more easily increased.

The accuracy of the female threaded portion may also be increased when the entire body of the unit container 122 is made of a metal. However, when the support metal plate 72 made of a metal is provided on the unit container 122 made of a resin material as in the present exemplary embodiment, the weight of the image reading apparatus 1 may be reduced.

As illustrated in FIG. 4B, the support metal plate 72 includes an inner portion 72A that opposes an inner surface of the front side wall 122A of the unit container 122, an outer portion 72B that opposes the outer surface of the front side wall 122A, and a connecting portion 72C that extends along the thickness of the front side wall 122A and connects the inner portion 72A and the outer portion 72B to each other.

In the present exemplary embodiment, the support metal plate 72 is attached to the unit container 122 such that the front side wall 122A is sandwiched between the inner portion 72A and the outer portion 72B. Accordingly, the support metal plate 72, which is an example of a support member, is fixed to the unit container 122 in the first scanning direction even when the screw member 71 is not provided.

In the present exemplary embodiment, as illustrated in FIGS. 4A and 4B, projecting pieces 122F project from the bottom portion 122E of the unit container 122. Each projecting piece 122F is arranged so as to oppose the inner surface of the front side wall 122A, and extends so as to approach the inner surface of the front side wall 122A.

In the present exemplary embodiment, each projecting piece 122F urges the support metal plate 72 toward the front side wall 122A, so that the support metal plate 72 is pressed against the inner surface of the front side wall 122A.

Figure 6:
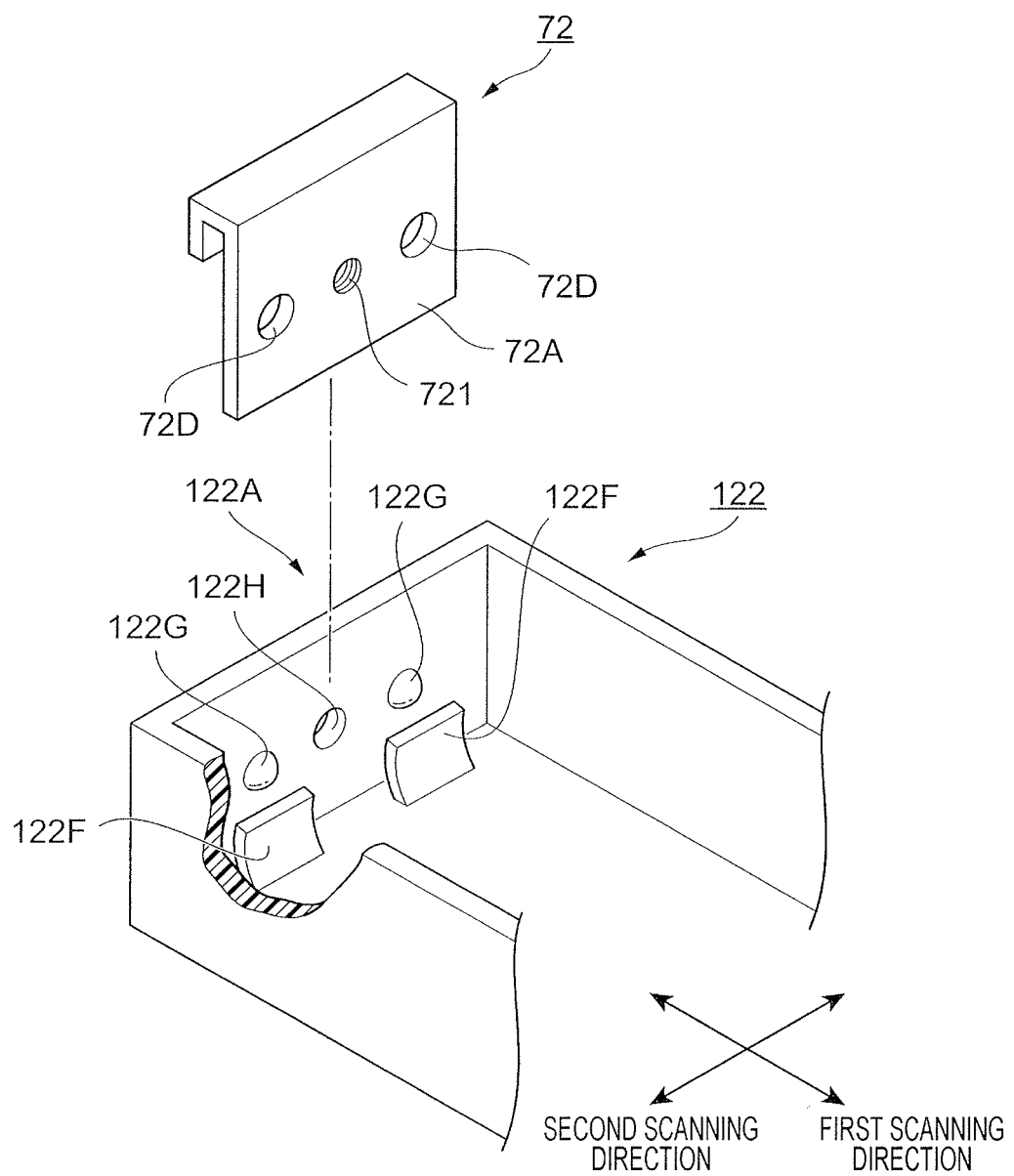
FIG. 6 illustrates an inner surface of a front side wall in the state before a support metal plate is attached.

FIG. 6 illustrates the inner surface of the front side wall 122A in the state before the support metal plate 72 is attached.

Two projections 122G are provided on the inner surface of the front side wall 122A at different positions in the second scanning direction. The inner portion 72A of the support metal plate 72 has receiving portions 72D that receive the projections 122G. The receiving portions 72D are formed as through holes.

When the support metal plate 72 is attached to the front side wall 122A, the projections 122G are inserted into the receiving portions 72D. Accordingly, the support metal plate 72 is restricted from being moved in the vertical direction and the second scanning direction. The front side wall 122A has a screw through hole 122H, which allows the screw member 71 to be inserted therethrough, at a position between the two projections 122G.

The inner portion 72A of the support metal plate 72 has the through hole 721 at a position between the two receiving portions 72D. The female threaded portion that meshes with the male threaded portion 71A of the screw member 71 is formed on the inner peripheral surface of the through hole 721.

The screw urging member 73 will now be described.

Referring to FIG. 4B, the screw urging member 73 urges the screw member 71 in the axial direction. More specifically, the screw urging member 73 urges the screw member 71 in such a direction that the screw member 71 moves away from the unit body 121. Accordingly, the screw member 71 is pressed against the support metal plate 72, so that the risk that the screw member 71 will be rotated unexpectedly is reduced.

Figure 7:
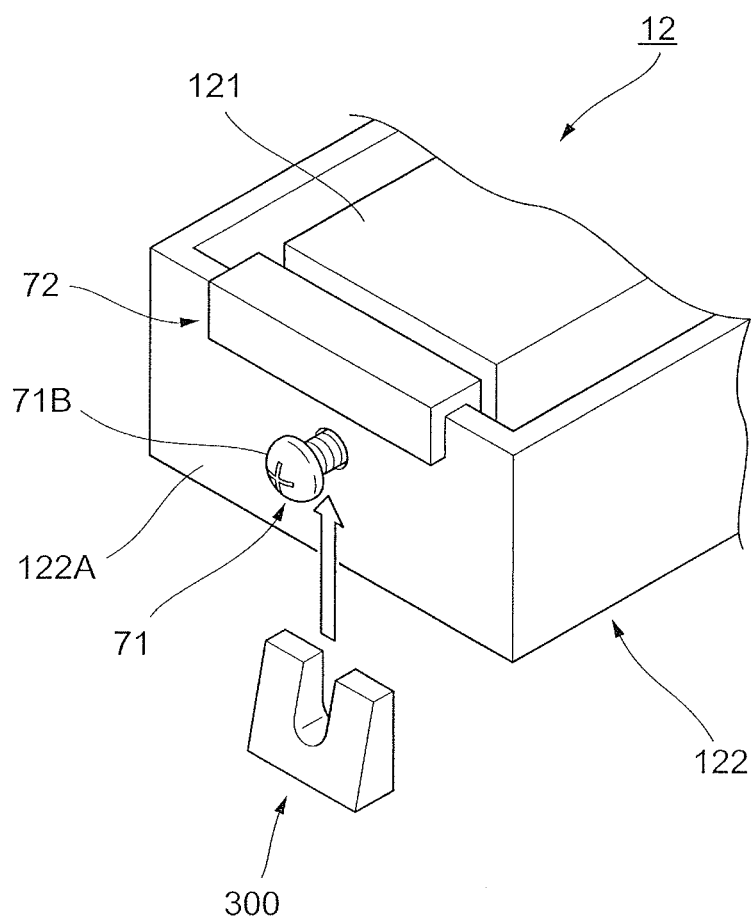
FIG. 7 illustrates an example of another structure of a screw urging member.

The screw urging member 73 is formed of, for example, a spring washer. Alternatively, as illustrated in FIG. 7, which illustrates another example of a structure of the screw urging member 73, the screw member 71 may instead be urged by inserting a wedge-shaped member 300 into a space between the screw head portion 71B of the screw member 71 and the outer surface of the front side wall 122A. The wedge-shaped member 300 has a small thickness at a front edge thereof and a large thickness at a rear edge thereof in the direction in which the wedge-shaped member 300 is inserted.

The unit container 122 will be further described.

As illustrated in FIG. 4A, four projecting portions 122T are formed on the inner surface of the unit container 122.

Two of the four projecting portions 122T are provided near at one end of the unit container 122 in the longitudinal direction (end corresponding to the far-side end portion 123 of the reading unit 12). These two projecting portions 122T oppose each other with the unit body 121 interposed therebetween.

The other two projecting portions 122T are provided near the other end of the unit container 122 in the longitudinal direction (end corresponding to the near-side end portion 124 of the reading unit 12). These two projecting portions 122T also oppose each other with the unit body 121 interposed therebetween.

In the present exemplary embodiment, owing to the four projecting portions 122T, the gap between the outer surface of the unit body 121 and the inner surface of the unit container 122 is reduced, so that the unit body 121 is not easily displaced with respect to the unit container 122. More specifically, the unit container 122 is not easily displaced in the second scanning direction.

When the gap between the outer surface of the unit body 121 and the inner surface of the unit container 122 is small, tilting of the unit body 121 with respect to the first scanning direction is reduced. Accordingly, the stability of linear movement of the unit body 121 in the first scanning direction is increased.

In the present exemplary embodiment, one of the four projecting portions 122T (the projecting portion 122T denoted by 4A and located near the front end) is elastically deformable (formed in the shape of an elastic piece), and is pressed against a side surface of the unit body 121 (surface extending in the longitudinal direction of the unit body 121).

Accordingly, in the present exemplary embodiment, the unit body 121 is pressed against the two projecting portions 122T at the side opposite to the side at which the one projecting portions 122T is provided. Therefore, displacement of the unit body 121 relative to the unit container 122 is further reduced. The one projecting portion 122T (the projecting portion 122T denoted by 4A) serves as a pressing unit that urges the unit body 121 in the second scanning direction, and presses the unit body 121 against the unit container 122.

In this example, the one projecting portion 122T that urges the unit body 121 (hereinafter referred to as an "urging projecting portion 122T") is provided near the end adjacent to the screw member 71 (front end). However, the urging projecting portion 122T may instead be provided near the end opposite to the end adjacent to the screw member 71 (rear end).

The urging projecting portion 122T may instead be provided near each of the end adjacent to the screw member 71 and the opposite end.

In the present exemplary embodiment, the urging projecting portion 122T is used to urge the unit body 121 against the unit container 122 by using. However, a separate spring member may be provided to urge the unit body 121 against the unit container 122.

In the case where a single urging projecting portion 122T is provided as described above, among the end adjacent to the screw member 71 (front end) and the end opposite thereto (rear end), the urging projecting portion 122T may be provided near the end adjacent to the screw member 71 (front end). In such a case, compared to the case in which the urging projecting portion 122T is provided near the end opposite to the screw member 71 (rear end), the stability of linear movement of the unit body 121 may be increased.

Here, in the case where the urging projecting portion 122T is provided near the end adjacent to the screw member 71, displacement of the front end portion of the unit body 121 may be suppressed. In such a case, a front end surface 121F (see FIG. 4A) of the unit body 121 (surface pressed by the screw member 71) may be easily arranged so as to be perpendicular to the direction in which the screw member 71 extends. Accordingly, the stability of linear movement of the unit body 121 may be increased.

Figure 8:
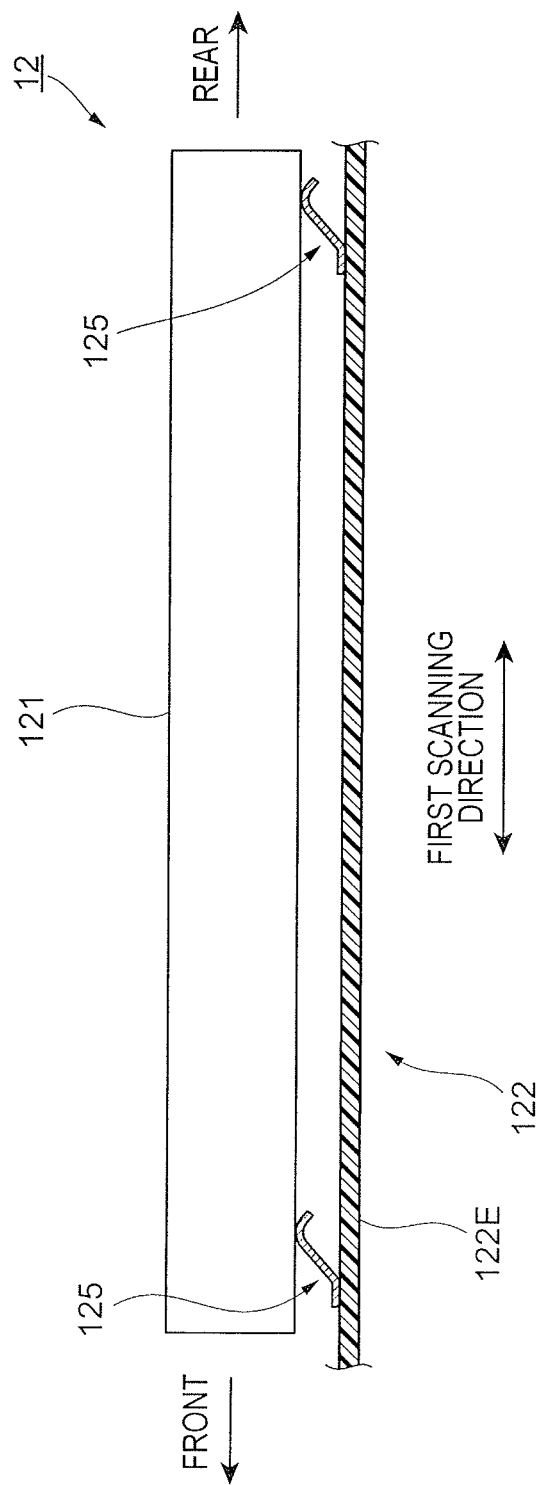
FIG. 8 illustrates a modification of urging members that urge a unit body upward.

FIG. 8 illustrates a modification of the urging members 125 that urge the unit body 121 upward.

In the above-described example, coil springs are used to urge the unit body 121. However, as illustrated in FIG. 8, leaf springs may instead be used to urge the unit body 121.

The leaf springs may be arranged such that the leaf springs extend in the same direction. More specifically, in FIG. 8, the leaf springs extend in the first scanning direction (longitudinal direction of the unit body 121), and are oriented so as to extend in the same direction along the first scanning direction. In this example, each leaf spring extends toward the rear, that is, in the direction in which the screw member 71 is inserted (not illustrated in FIG. 8).

In the case where the leaf springs extend in the same direction, compared to the case in which the leaf springs extend in different directions, the stability of movement of the unit body 121 in the first scanning direction may be increased. More specifically, in the case where the leaf springs extend in the same direction, unlike the case in which the leaf springs extend in different directions, the leaf springs are in the same orientation with respect to the unit body 121. Therefore, the stability of movement of the unit body 121 in the first scanning direction is increased.

Figure 9:
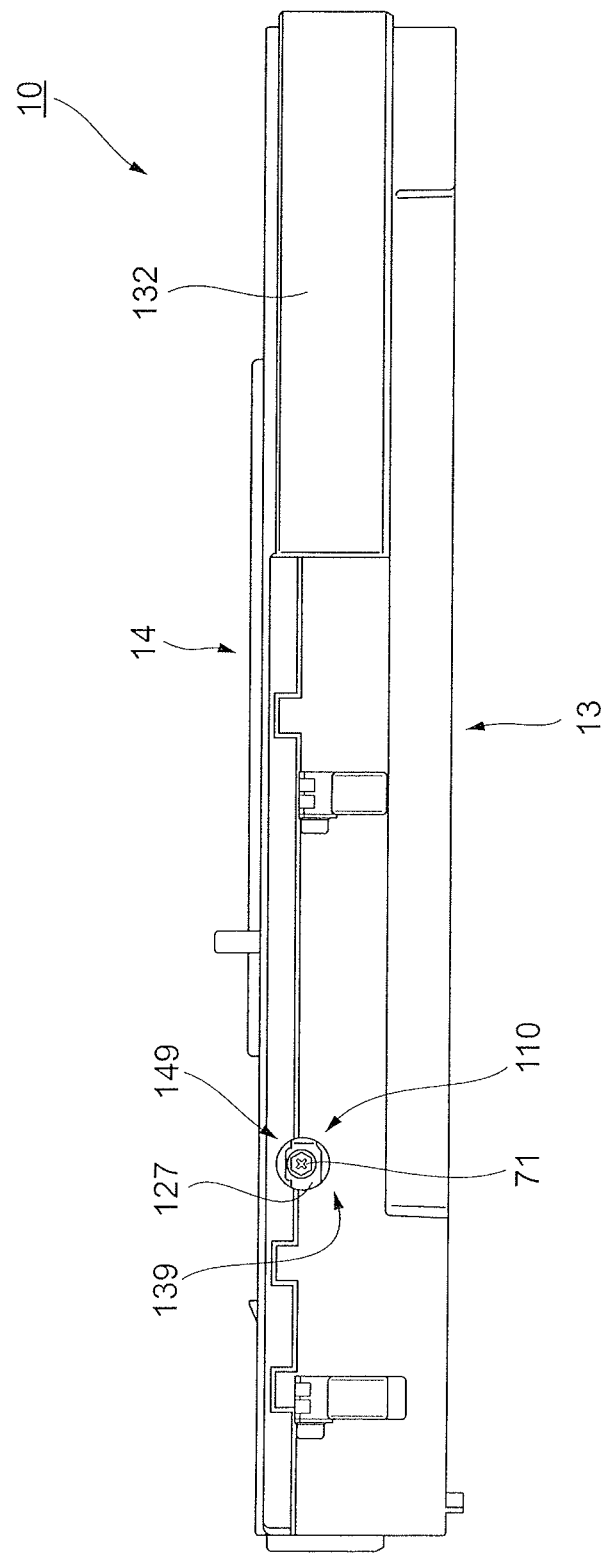
FIG. 9 illustrates a scanner device viewed from a front-surface side.

FIG. 9 illustrates the scanner device 10 viewed from the front-surface-132 side.

The front surface 132 of the scanner device 10 has an opening 110 (through hole) which enables the adjuster to operate the adjustment mechanism 127. The adjuster inserts a driver into the scanner device 10 through the opening 110, and rotates the screw member 71. Accordingly, the unit body 121 is moved in the first scanning direction.

The adjustment of the position of the unit body 121 in the first scanning direction is performed during the assembly of the scanner device 10 (during the manufacturing process). More specifically, as described above, the screw member 71 is rotated with a driver inserted through the opening 110 formed in the front surface 132.

In the present exemplary embodiment, the screw member 71 is operated after the upper cover 14 (the upper cover 14 to which the first platen glass 11A and the second platen glass 11B are mounted) is attached to the housing 13. Thus, compared to the case in which the upper cover 14 is attached to the housing 13 after the screw member 71 is operated (after the adjustment of the position of the unit body 121), the position adjustment accuracy is increased. In the case where the upper cover 14 is attached after the screw member 71 is operated, there is a risk that the unit body 121 will be moved in the first scanning direction due to a force applied thereto after the position adjustment.

It is not necessary that the position adjustment of the unit body 121 be performed during the assembly of the scanner device 10 (during the manufacturing process), and the position adjustment may instead be performed after the image reading apparatus 1 has been put to use. Also in this case, the adjustment is performed by inserting a tool through the opening 110. In the present exemplary embodiment, the position of the unit body 121 may be adjusted from the outside of the scanner device 10 without removing the upper cover 14 or other components. Therefore, the position of the unit body 121 may be easily adjusted even after the image reading apparatus 1 has been put to use. In other words, in the present exemplary embodiment, the position of the unit body 121 may be adjusted even in the state in which the unit body 121 is disposed between the first platen glass 11A and the urging members 125. Thus, the position of the unit body 121 may be adjusted after the image reading apparatus 1 has been put to use.

In the present exemplary embodiment, the opening (through hole) 110 is not formed as a single hole formed in a single member. Instead, as illustrated in FIG. 9, a semicircular cut portion 139 is formed in the housing 13 (see also FIG. 2), and a semicircular cut portion 149 is formed in the upper cover 14. The opening 110 is formed when the two cut portions 139 and 149 are arranged so as to oppose each other.

Although the opening 110 is not covered in FIG. 9, the opening 110 is covered with an outer cover (not shown) after the position adjustment of the unit body 121.

In the present exemplary embodiment, the adjustment mechanism 127 is provided in a front section of the image reading apparatus 1, and the opening 110 is formed in the front surface 132. The adjuster adjusts the position of the unit body 121 from the front of the image reading apparatus 1.

In the present exemplary embodiment, the opening 110 is formed in the front surface 132, which is an example of a user-side surface, and the adjuster adjusts the position of the unit body 121 through the opening 110. More specifically, in the present exemplary embodiment, the opening 110 is formed in the front surface of the housing 13 (front surface 132), which is an operation surface through which the image reading apparatus 1 is operated, and the adjuster adjusts the position of the unit body 121 through the opening 110.

Accordingly, compared to the case in which, for example, the opening 110 is formed in the rear portion of the image reading apparatus 1 and the position of the unit body 121 is adjusted from the rear, the position adjustment of the unit body 121 may be more easily performed.

In the present exemplary embodiment, in the process of assembling the image reading apparatus 1 (in the manufacturing process), components of the image reading apparatus 1 are assembled from the front of the image reading apparatus 1. Therefore, when the position of the unit body 121 is adjustable from the front, it is not necessary to change, for example, the orientation of the image reading apparatus 1, and the work efficiency is increased.

In addition, since the opening 110 is formed in the front surface 132, the position adjustment may be easily performed even after the image reading apparatus 1 has been put to use. In general, to enable the user to set document sheets to the image reading apparatus 1, the space in front of the image reading apparatus 1 is often free from objects. Therefore, when the opening 110 is formed in the front surface 132, compared to the case in which the opening 110 is formed in the rear surface, the position adjustment may be performed more easily.

Figure 10:
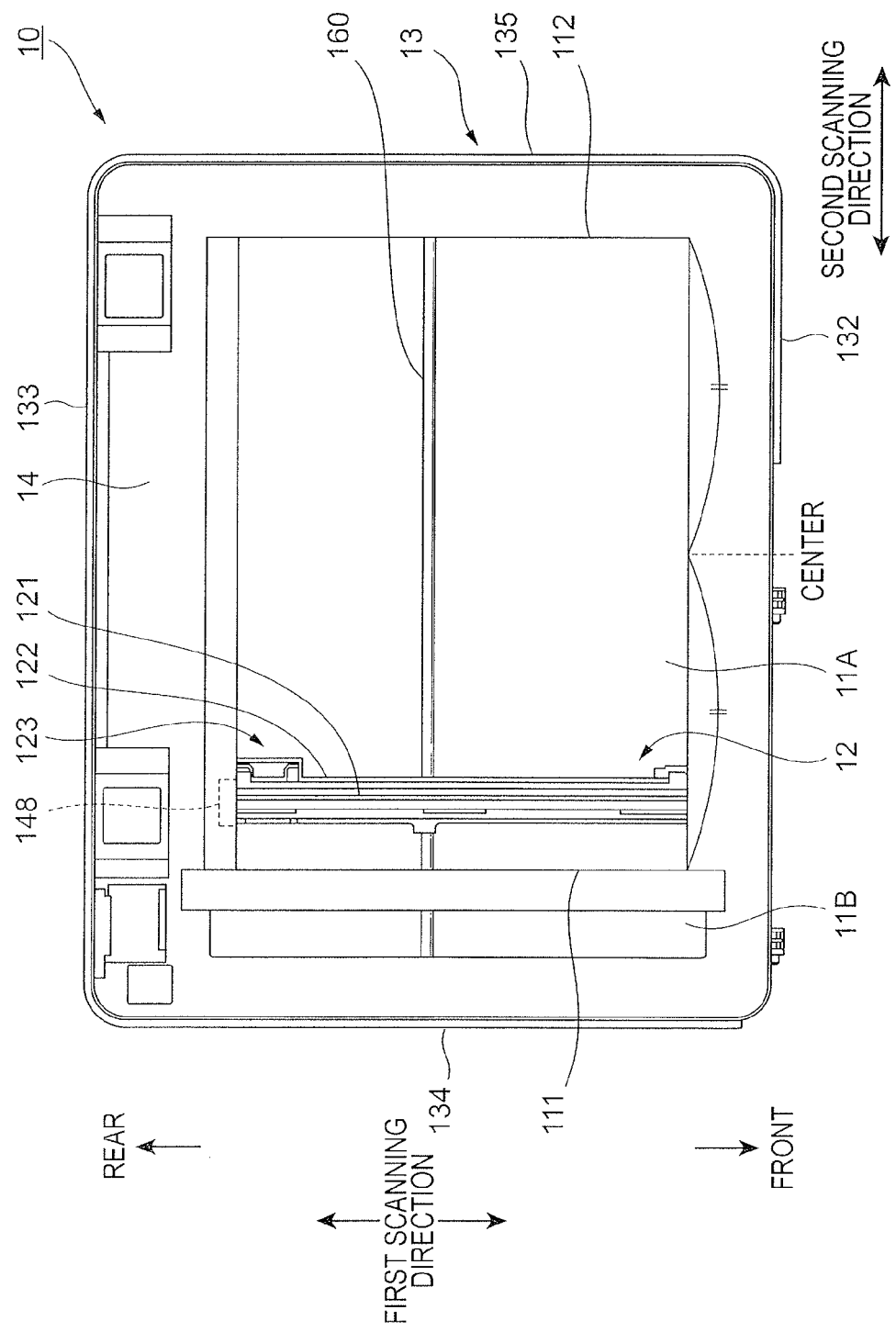
FIG. 10 is a top view of the scanner device.

FIG. 10 is a top view of the scanner device 10.

In the present exemplary embodiment, a black patch 148 (a mark to be read that is used as a reference for position adjustment, a position adjustment target) is formed on the back surface of the upper cover 14 at a position where the black patch 148 opposes the far-side end portion 123 of the reading unit 12. In the present exemplary embodiment, the black patch 148 is formed by printing a black mark on the black surface of the upper cover 14.

When the position of the unit body 121 in the first scanning direction is adjusted, the screw member 71 is rotated and an output signal from the reading unit 12 is monitored. When a predetermined output signal is obtained, the adjustment is finished.

In the present exemplary embodiment, the black patch 148 is located near the second platen glass 11B in the second scanning direction.

The first platen glass 11A according to the present exemplary embodiment includes a first side 111 that is adjacent to the second platen glass 11B, and a second side 112 that opposes the first side 111. The black patch 148 is located near the first side 111. More specifically, the black patch 148 is closer to the second platen glass 11B than the center of the first platen glass 11A in the second scanning direction is.

Accordingly, compared to the case in which the black patch 148 is located far from the second platen glass 11B, the quality with which the document sheet fed by the document feeder 20 is read may be increased.

In the present exemplary embodiment, the unit body 121 (reading unit 12) is moved in the second scanning direction while being guided by the support shaft 160. Here, there is a possibility that the support shaft 160 will be at an angle with respect to the second scanning direction due to dimensional tolerance or the like. In such a case, the unit body 121 will be moved in the first scanning direction while being moved in the second scanning direction.

In the case where the position adjustment of the unit body 121 in the first scanning direction is performed at a location near the second side 112 of the first platen glass 11A and the support shaft 160 is tilted, when the unit body 121 is moved from the location of the position adjustment thereof to the position below the second platen glass 11B, the unit body 121 is moved in the first scanning direction. In this case, there is a risk that, for example, an image near an edge of the document sheet (edge that extends in the second scanning direction) cannot be read.

In contrast, when the position adjustment of the unit body 121 is performed at a location near the first side 111 of the first platen glass 11A, the displacement of the unit body 121 in the first scanning direction caused when the unit body 121 is moved to the position below the second platen glass 11B is reduced. In this case, compared to the case in which the position adjustment of the unit body 121 is performed at a location near the second side 112 of the first platen glass 11A, the risk that an image near an edge of the document sheet cannot be read is reduced.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a reader configured to read an image of a document by using a plurality of light receiving elements arranged in a first scanning direction;
    a moving mechanism configured to move the reader in a second scanning direction to move a reading position at which the reader reads the document;
    an adjusting mechanism configured to move the reader in the first scanning direction to adjust a position of the reader in the first scanning direction;
    a second container that contains the reader; and
    a support member that supports a screw and that is located at a position fixed relative to the second container,
    wherein the screw is configured to move relative to the support member so that the reader is moved relative to the second container in the first scanning direction
    wherein the adjusting mechanism includes a screw that is configured to move in the first scanning direction to adjust the position of the reader.

2. The image reading apparatus according to claim 1, further comprising:
    a first container in which the reader, the moving mechanism, and the adjusting mechanism are contained, wherein the first container has an opening that enables the adjusting mechanism to be operated from the outside of the first container.

3. The image reading apparatus according to claim 2, wherein the opening is formed in a front surface of the first container, the front surface serving as an operation surface used to operate the image reading apparatus.

4. The image reading apparatus according to claim 1, wherein the second container is a resin component, and the support member is made of a metal.

5. The image reading apparatus according to claim 1, wherein the support member is fixed to the second container in the first scanning direction even when the screw is not present.

6. The image reading apparatus according to claim 1, further comprising:
   an elastic member that elastically urges the reader toward the screw,
   wherein the moving mechanism is configured to move the second container in the second scanning direction to move the reader in the second scanning direction.

7. The image reading apparatus according to claim 1, further comprising:
   a first container in which the reader, the moving mechanism, and the adjusting mechanism are contained;
   an urging member that urges the reader; and
   a platen glass that is directly or indirectly supported by the first container,
   wherein the adjusting mechanism is capable of adjusting the position of the reader while the reader is disposed between the urging member and the platen glass.

8. An image reading apparatus comprising:
   a reader configured to read an image of a document by using a plurality of light receiving elements arranged in a first scanning direction;
   a moving mechanism configured to move the reader in a second scanning direction to move a reading position at which the reader reads the document;
   an adjusting mechanism configured to move the reader in the first scanning direction to adjust a position of the reader in the first scanning direction; and
   a first container in which the reader, the moving mechanism, and the adjusting mechanism are contained,
   wherein the first container has an opening that enables the adjusting mechanism to be operated from the outside of the first container without opening a side of the first container.

9. An image reading apparatus comprising:
   a reader configured to read an image of a document by using a plurality of light receiving elements arranged in a first scanning direction;
   a moving mechanism configured to move the reader in a second scanning direction to move a reading position at which the reader reads the document;
   an adjusting mechanism configured to move the reader in the first scanning direction to adjust a position of the reader in the first scanning direction;
   a second container that contains the reader, the moving mechanism configured to move the second container in the second scanning direction to move the reader in the second scanning direction; and
   an elastic member that elastically urges the reader toward a screw.

* * * * *